July 12, 1960  S. H. MAGID  2,944,550
THERMOPLASTIC GARMENTS
Filed July 13, 1954  2 Sheets-Sheet 1
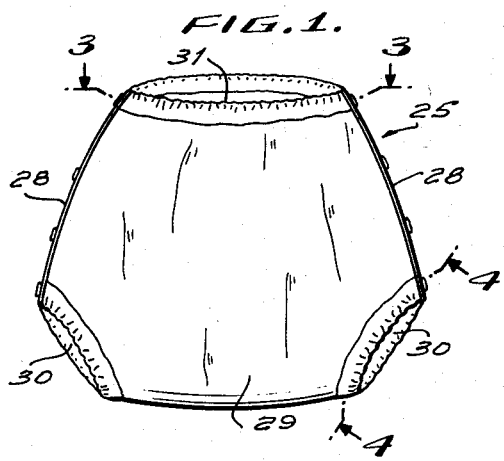
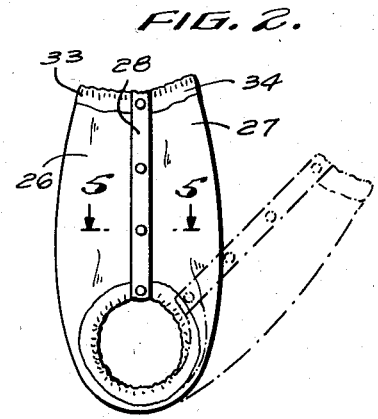
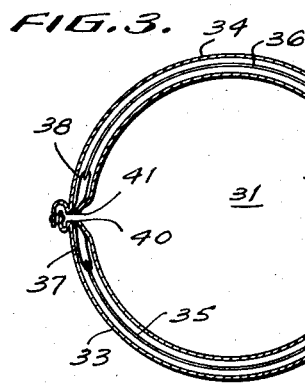
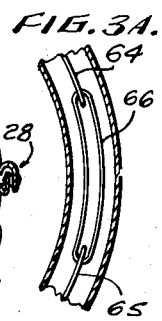
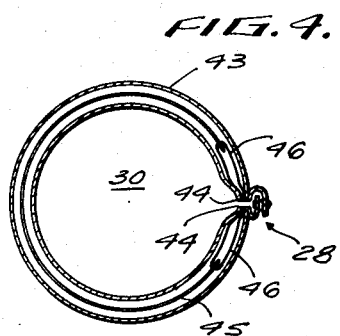
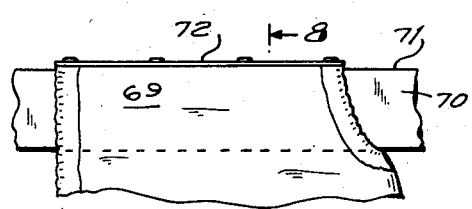
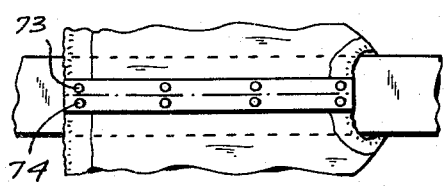
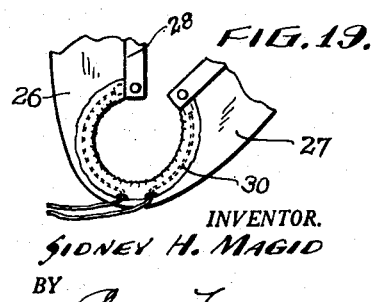
INVENTOR.
SIDNEY H. MAGID
BY
Percy Freeman
ATTORNEY July 12, 1960   S. H. MAGID   2,944,550
THERMOPLASTIC GARMENTS
Filed July 13, 1954   2 Sheets-Sheet 2
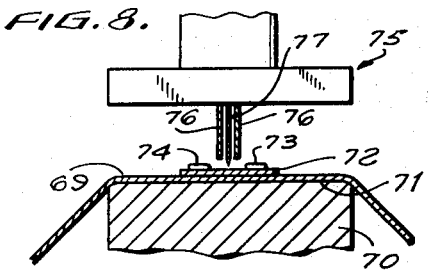
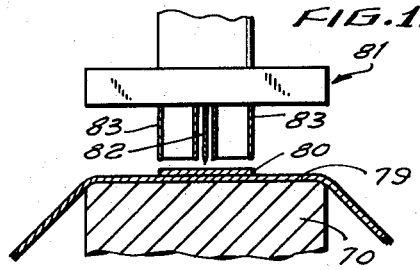
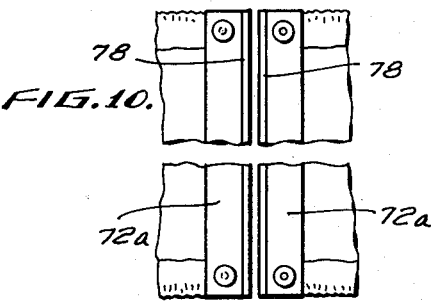
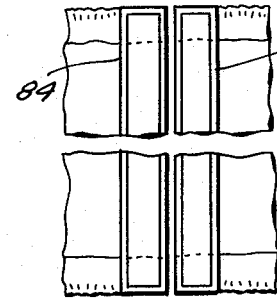
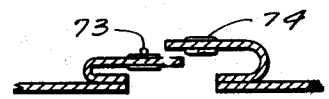
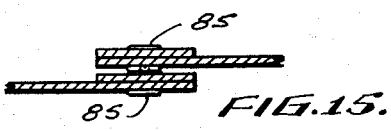
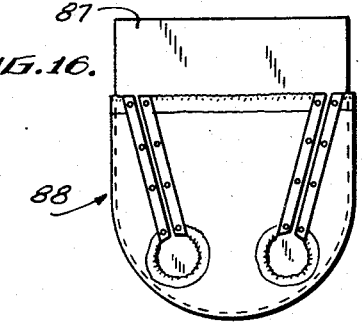
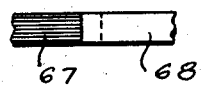
INVENTOR.
SIDNEY H. MAGID
BY Percy Freeman
ATTORNEY United States Patent Office 2,944,550
Patented July 12, 1960

2,944,550

THERMOPLASTIC GARMENTS

Sidney H. Magid, Morrisville, Pa.
(110 Elm Drive, Roslyn (E. Hills), N.Y.)

Filed July 13, 1954, Ser. No. 443,105

5 Claims. (Cl. 128—287)

This invention relates generally to garments and methods of making the same. It is particularly directed to baby pants fabricated for thermoplastic sheet material and embraces certain novel features in baby pants of the front-opening or diaper type.

This invention is an improvement over my pending U.S. patent application, Ser. No. 424,150, filed April 19, 1954.

In that case, all the forms shown are for permanently closed garments wherein it is necessary to slip the entire garment over the feet of the wearer. In the present invention, the baby pants are of the diaper type or open front type wherein the front and back panels are detachably secured along the sides of the garment so that the garment may be opened to completely flat, single plane condition for ease in putting it on and in removing it from a child.

In my copending application, the use of an endless constricting element in the leg bindings and even the waist binding was entirely satisfactory. In the present invention, however, it was a problem to devise means and methods for the use of a similarly advantageous binding in the making of the garment and still be able to sever or split the binding during manufacture, without, however, destroying the constricting element or its function. Hence, it is a principal object of this invention to prefabricate cores to be enclosed in the bight of the tunnel-like cuff members or bindings and to provide such members which may be attached to the bounding edges of garments or other articles which are to be subsequently severed, together with the garment part to which they are attached, so the severed parts may subsequently be detachably rejoined while still maintaining the water-proof tightness of the tunnels with their enclosed cores. Or, if desired, the walls of the tunnels may be perforate, or foraminous.

Another object is to provide a method and a construction whereby a plastic article with the features of the type described provides the facility of anchoring a core within a tunnel so that said tunnel may be provided with sealed ends which can be separably joined.

Other objects and advantages of the present invention will become apparent upon reference to the following detailed description and drawings, which form a material part of this disclosure.

In the drawings:

Fig. 1 is a front view showing a diaper type baby pants garment structure in accordance with the present invention.

Fig. 2 is a side view showing the garment of Fig. 1, and illustrating in dot-and-dash outline an open position of the garment.

Fig. 3 is a sectional view taken substantially along the line 3—3 of Fig. 1 and showing the novel waist edging construction of the present invention.

Fig. 3a is a fragmentary sectional view showing a portion of the garment as illustrated in Fig. 3, but at an earlier stage in the method of the present invention.

Fig. 4 is a sectional view taken substantially along the line 4—4, showing the leg opening edging of the present invention.

Fig. 5 is a fragmentary, sectional view, greatly enlarged, showing one form of separable side seam construction according to the present invention, as indicated in section 5—5 of Fig. 2.

Fig. 6 is a partial elevational view showing an intermediate step in the manufacturing method of the present invention.

Fig. 7 is a top plan view of the steps shown in Fig. 6.

Fig. 8 is an elevational view showing the method of the present invention at a slightly later stage.

Fig. 9 is an elevational view showing the product resulting from the step of Fig. 8.

Fig. 10 is a top plan view showing the article of Fig. 9.

Fig. 11 is a sectional view, showing the article of Fig. 10, with the flaps reentrantly positioned to permit interengagement of the separable fasteners.

Fig. 12 is an elevational view showing a slightly modified form of the method of the present invention, at a slightly later stage.

Fig. 13 is an elevational view showing the product resulting from the step of Fig. 12.

Fig. 14 is a top plan view showing the article of Fig. 12.

Fig. 15 is a sectional view, showing the article of Fig. 12, with the flaps reentrantly positioned to permit interengagement of the separable fasteners.

Fig. 16 is a plan view illustrating another form of apparatus on which the process may be practiced.

Fig. 17 is a plan view showing one form of core adapted for use in the edging construction of the present invention.

Fig. 18 is an enlarged fragmentary view of the core of Fig. 17.

Fig. 19 is a fragmentary side view of the garment shown in Figs. 1 and 2, illustrating a drawstring used as the core.

Referring now more particularly to the drawings, and specifically to Figs. 1–5 thereof, the article of the invention illustrated therein comprises a pair of baby pants, generally designated 25 having front and back panels or sections 26 and 27. The front and back pants panels or sections are connected together along the sides by separable side seams 28, 28, and along the bottom by the crotch portion 29, to define a pair of leg openings 30, 30 and a waist opening 31.

Thus, the pants 25 may be formed from a single sheet of thermo-plastic material folded upon itself in the crotch region, or of two complementary sheets welded together at the crotch and detachably secured at the sides, as will appear presently in greater detail.

Extending along the upper edges of the front and back sections 26 and 27, which bound the waist opening 31, are front and back lengths 33 and 34 of tunnel-like edging, also fabricated of thermo-plastic sheet material and each enclosing an elastic core 35 and 36, respectively, to form constricting elements. That is, each of the cores is formed with a central elastic portion, such as rubber or the like, and end portions of thermo-plastic material, the end portions 37 of the core 35 and the end portions 38 of the core 36 being of thermo-plastic material, such as vinyl or the like. As best seen in Fig. 3, the ends of the tubular, front waist edging 33 are sealed closed, as at 40, 40, and the thermo-plastic core portions 37 are secured to the edging ends. Similarly, the ends 41 of the rear waist edging 34 are sealed closed, and the thermo-plastic portions 38 are secured thereto, respectively.

Each of the leg edging and seam constructions are identical, so that a detailed description of one will suffice. As best seen in Fig. 4, a single tunnel-like edging 43 is secured about the boundary of each leg opening, having its opposite ends 44, 44 terminating at the side seam 28 to permit separation of the latter. Extending through each of the tubular edgings 43 is an elastic core 45 which has thermo-plastic end portions 46 secured to the ends of the edging and combines therewith to form a constricting element. That is, the ends 44 of the tubular edging 43 are sealed closed, and each end portion 46 of the core 45 is secured to the adjacent edging end portion.

The separable seams 28 are each formed by a pair of back and front reinforcing strips 48 and 49 extending along the side edges, respectively, of the back and front garment sections 27 and 26. More particularly, the reinforcing strip 48 is secured in overlying relation along the side edge of the back pants section 28 and has its upper and lower end portions overlying and secured to the adjacent end portions of the rear waist edging 34 and leg edging 43. Similarly, the reinforcing strip 49 is secured along the side edge of the front pants section 26 and has its upper and lower end portions secured to the adjacent end portions of the front waist edging 33 and leg edging 43.

As best seen in Fig. 5, the reinforcing strips 48 and 49 are each secured along only one longitudinal edge to their respective pants sections and edging end portions, and hence foldable into overlying relation with respect to each other to define a rugged and durable seam of neat appearance and minimum bulk. The reinforcing strips are provided with interengageable, separable fastening elements 50 and 51 so as to releasably hold the seam in closed condition. While the back section reinforcing strip 48 is illustrated as being disposed outwardly of the front section reinforcing strip 49, it is, of course, appreciated that this arrangement may be reversed, if desired.

At the outset in the manufacture of the above described baby pants, the front and back thermoplastic sheet sections are formed integrally or welded together at the crotch and sides. Or the baby pants may be molded in one operation as by dipping a form into liquid plastics material, thus producing a film which, when cured, is peeled from the form. A tubular annulus or cuff of thermoplastic material is then secured about each leg and waist opening in a manner similar to that disclosed in my copending application mentioned hereinbefore. In the instant invention, however, the core is formed with at least one thermoplastic segment, in contradistinction to the invention of my above-mentioned copending patent application, wherein such a core segment was unnecessary.

While the leg and waist opening edgings are all formed and secured in substantially the manner described hereinbefore, the elastic core or constricting member provided in each of the leg bindings includes a single thermoplastic segment disposed along the side of the pants; and, the elastic annulus or core employed in the waist opening includes a pair of thermoplastic segments located on opposite sides of the garment. For example, as shown in the fragmentary view of Fig. 3a, the waist opening constricting member may include a pair of rubber bands 64 and 65 having their ends connected together by a pair of vinyl bands 66; or in the case of a leg opening constricting member, a single rubber band having its opposite ends connected together by a single vinyl band.

An additional form of constricting element is shown in Fig. 17 and Fig. 18, wherein a strip of web elastic 67 has its opposite ends connected together by a vinyl strip 68. The constricting element of Figs. 17 and 18 may be secured directly to the garment either by stitching, or by heat sealing when the web elastic has thermoplastic surface characteristics. Of course, the web elastic or rubber 67 of Figs. 17 and 18 may have two thermoplastic or vinyl segments to permit use in the waist opening edging.

The pants are next placed upon a bar or horn die 70 with one side portion of the pants supported on the operating die surface 71. An elongated reinforcing sheet or strip 72, having pairs of interengageable, separable fastening elements 73 and 74 secured therein, is placed overlying the sheet material 69 of the garment on the die surface 71, extending between the leg and waist openings and transversely across the leg and waist edgings in the regions of the thermoplastic core segments.

An upper, heated die 75, including a pair of depending, parallel spaced plates 76, 76, and an intermediate blade 77, is moved into engagement with the reinforcing strip 72 along a longitudinally extending, intermediate portion of the latter. The die 75 effects severing of the thermoplastic reinforcing sheet 72 along a longitudinally extending, central portion thereof, and also severs the underlying portion of the sheet material 69. Simultaneously, the severed portions 72a, 72a of the reinforcing sheet 72 are each welded by heat sealing along their severed edges, as at 78, 78, to the underlying severed edge portion of the garment material 69. In addition, the end portions of the reinforcing sheet 72 and the underlying waist and leg edging portions are simultaneously severed and heat sealed upon movement of the die 75 toward the die 70. That is, the reinforcing sheet and pants garment, including the tubular edgings are completely severed along a line extending between the leg and waist openings, and the severed reinforcement sheet end portions are heat sealed or welded along their severed edges to the underlying severed edges of the waist and leg opening edgings. Further, the severed, overlying edging portions are heat sealed or welded to each other to close the edging ends and secure each severed portion of the thermoplastic core segment to the adjacent closed edging ends. That is, the overlying severed flap portions of the waist and leg edgings are heat sealed or welded together with the intermediate portions of the severed cored segment secured therebetween.

This procedure is, of course, repeated on both sides of the pants to form an open, or diaper-type baby pants garment. As the severed portions 72a, 72a of the reinforcing sheet 72 were secured only along their severed edges, as at 78, 78, see Fig. 10, it will be apparent that the reinforcing sheet portions may be folded toward each other, as in Fig. 11, for engaging the fastener elements 73 and 74.

In Figs. 12–15, is shown a slightly modified method of baby pants manufacture, according to the present invention. A pair of the closed type baby pants having waist and leg opening edging provided thereon is mounted on the bar or horn die 70, as described hereinabove in connnection with Fig. 6 and Fig. 7. A reinforcing sheet of thermoplastic material 80 is placed upon the garment material 81, extending along one side of the garment between the waist opening and adjacent leg opening, and overlying the waist and leg opening edgings in the regions of the associated thermoplastic core segments.

A heated die 81 is provided with a depending blade or plate 82 disposed longitudinally of and over a central portion of the reinforcing sheet 80. On opposite sides of the blade 82 are provided a pair of downwardly opening, box-like die members 83, 83.

Upon movement of the die 81 toward the die 70, the blade 82 will, by means of heat and pressure, weaken or sever the reinforcing sheet 80, longitudinally thereof, and also weaken or sever the garment sheet material 79 and waist and leg edgings underlying the reinforcing sheet. However, in this form of the invention, the box-like elements 83, 83 serve to seal each of the severed reinforcing sheet portions 80a, 80a about its periphery, as at 84, 84, to the underlying sheet and edging portions. Simultaneously, the adjacent overlying severed flap portions of the waist and leg edgings are welded or heat sealed to each other with the intermediate portions of the severed core segments secured therebetween.

To each of the severed reinforcing sheet portions 80a, 80a are fixed the separable, interengageable fastening elements 85 for separably securing the front and back garment sections together along the side seams.

In Fig. 16 is illustrated another slightly modified form of the present invention, wherein a shaped plate 87 is inserted into a pair of closed thermoplastic baby pants 88 having the waist and leg edgings of the present invention secured thereto. This form of the invention is particularly well adapted for use with baby pants of the type having a full or relatively large back section. In this type of garment, the leg openings are disposed largely in the front section, appearing as illustrated in Fig. 16, when in flat condition. By this form of the invention, the plate 87 may be substituted for the horn die 70, so as to permit simultaneous forming of both side seams.

From the foregoing, it is seen that the present invention provides a novel garment construction and method of making the same, which fully accomplish their intended objects, and which are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

Having thus described my invention, what I claim as new and desire to secure by Letters Patent, is:

1. In a blank of thermoplastic sheet material, to the opposite side edges of which are heat sealed along their respective lines of contact, strips of thermoplastic material which are to be separably joined; a separate elastic edging extending along each of the edges transverse to said strips, at least the ends of said elastic edging being entirely of thermoplastic material and welded in registry with said lines of contact.

2. In a blank of thermoplastic sheet material, to the opposite edges of which are heat sealed along their respective lines of contact, strips of thermoplastic material which are to be separably joined; separate tunneled edgings of thermoplastic material, each edging enclosing therein a pair of drawstrings, at least the enclosed ends of which are of thermoplastic material, said thermoplastic ends of said drawstrings being disposed in registry with said lines of contact and welded thereto.

3. In a blank of thermoplastic sheet material, the ends of which are to be joined, a separate edging extending along the edge perpendicular to the edges to be joined, the ends only, of said edging, being entirely of thermoplastic material, a binding strip of thermoplastic material heat sealed along each of the ends to be joined and transversely across said thermoplastic ends of the edging.

4. In a blank of thermoplastic sheet material, to the opposite side edges of which are heat-sealed along their respective lines of contact, strips of thermoplastic material which are to be separably joined; a separate edging having an elastic core member and extending along each of the edges transverse to said strips, at least the ends of said elastic core member being entirely of thermoplastic material and welded in registry with the said lines of contact.

5. In a blank of thermoplastic sheet material, the ends of which are to be joined, a separate edging having an elastic core member and extending along the edge perpendicular to the edges to be joined, the ends of said elastic core member being entirely of thermoplastic material, a binding strip of thermoplastic material heat-sealed along each of the ends to be joined and transversely across said thermoplastic ends of the core member.

References Cited in the file of this patent

UNITED STATES PATENTS

| | | |
|---|---|---|
| 2,004,088 | Alsop | June 11, 1935 |
| 2,468,445 | Hurst | Apr. 26, 1949 |
| 2,490,451 | Magid | Dec. 6, 1949 |
| 2,575,164 | Donovan | Nov. 13, 1951 |
| 2,664,895 | Shulman | Jan. 5, 1954 |